US012125693B2

(12) United States Patent
Cooks

(10) Patent No.: US 12,125,693 B2
(45) Date of Patent: Oct. 22, 2024

(54) SYSTEMS AND METHODS FOR CONDUCTING REACTIONS AND SCREENING FOR REACTION PRODUCTS

(71) Applicant: Purdue Research Foundation, West Lafayette, IN (US)

(72) Inventor: Robert Graham Cooks, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/378,247

(22) Filed: Oct. 10, 2023

(65) Prior Publication Data

US 2024/0038523 A1 Feb. 1, 2024

Related U.S. Application Data

(63) Continuation of application No. 18/101,265, filed on Jan. 25, 2023, now Pat. No. 11,784,035, which is a continuation of application No. 17/745,209, filed on May 16, 2022, now Pat. No. 11,594,408, which is a continuation of application No. 16/494,973, filed as application No. PCT/US2018/023747 on Mar. 22, 2018, now Pat. No. 11,361,954.

(60) Provisional application No. 62/474,902, filed on Mar. 22, 2017.

(51) Int. Cl.
*H01J 49/16* (2006.01)
*H01J 49/00* (2006.01)

(52) U.S. Cl.
CPC ........ *H01J 49/165* (2013.01); *H01J 49/0013* (2013.01)

(58) Field of Classification Search
CPC .... H01J 49/0013; H01J 49/142; H01J 49/145; H01J 49/165; H01J 49/0463
See application file for complete search history.

(56) References Cited

U.S. PATENT DOCUMENTS

| | | | | |
|---|---|---|---|---|
| 7,335,897 | B2 | 2/2008 | Takats et al. | |
| 7,361,311 | B2 | 4/2008 | Cooks et al. | |
| 8,304,718 | B2 | 11/2012 | Ouyang et al. | |
| 8,410,431 | B2 | 4/2013 | Ouyang et al. | |
| 2011/0159596 | A1* | 6/2011 | Keinan ................ | G01N 1/2211 422/86 |
| 2011/0220784 | A1 | 9/2011 | Roach et al. | |
| 2012/0012453 | A1 | 1/2012 | Rehman | |
| 2013/0280819 | A1* | 10/2013 | Cooks ................. | H01J 49/4205 250/288 |
| 2014/0224981 | A1 | 8/2014 | Owen et al. | |
| 2015/0136964 | A1 | 5/2015 | Cooks et al. | |

OTHER PUBLICATIONS

Bain, 2014, Mass Spectrometry in Organic Sysnthesis: Claisen-Schmidt Based-Catalyzed Condensation and Hammett Correlation of Substituent Effects, J. Chem. educ. 91:1985-1989.

(Continued)

*Primary Examiner* — David E Smith
*Assistant Examiner* — Hsien C Tsai
(74) *Attorney, Agent, or Firm* — Brown Rudnick LLP; Adam M. Schoen

(57) ABSTRACT

The invention generally relates to systems and methods for conducting reactions and screening for reaction products.

10 Claims, 7 Drawing Sheets

(56) References Cited

OTHER PUBLICATIONS

Bain, 2015, Accelerated Hantzsch electrospray synthesis with temporal control of reaction intermediates, Chem. Sci., vol. 6:397-401.
Bain, 2016, Accelerated Chemical Reactions and Organic Synthesis in Leidenfrost Droplets, Angewandte Chemie, 55 (35):10478-10482.
Banerjee, 2015, Syntheses of Isoquinoline and Substituted Quinolines in Charged Microdroplets, Angew. Chem. Int. Ed., vol. 54: pp. 14795-14799.
Extended European Search Report issued in European Application No. 18771480.3, date of mailing: Feb. 27, 2024, 9 pages.
Extended European Search Report issued in European Application No. 18771480.3, date of mailing: Nov. 16, 2020, 8 pages.
Gao, 2006, Handheld rectilinear ion trap mass spectrometer, Anal. Chem., 78:5994-6002.
Girod, 2011, Accelerated bimolecular reactions in microdroplets studied by desportion electrospray ionization mass spectrometry, Chem. Sci., vol. 2: pp. 501-510.
Hendricks, 2014, Autonomous in-situ analysis and real-time chemical detection using a backpack miniature mass spectrometer: concept, instrumentation development and performance, Anal. Chem., 86:2900-2908.
Hu, 2005, The Orbitrap: a new mass spectrometer, J. Mass. Spectrom., 40:430-433.
International Preliminary Report on Patentability, PCT/US2018/023747, dated Sep. 24, 2019, 7 pages.
International Search Report and Written Opinion, PCT/US2018/023747, dated Jul. 11, 2018, 9 pages.
Li, 2014, Mini 12, Miniature Mass Spectrometer for Clinical and other Applications—Introduction and Characterization, Anal. Chem., 86:2909-2916.
Li, 2016, The Role of the Interface in THin Film and Droplet Accelerated Reactions Studied by Competitive Substituent Effects, Angewandte Chemie International Edition, 55(10):3433-3437.
Muller, 2012, Accelerated Carbon-Carbon Bond-Forming Reactions in Preparative Electrospray, Agnew Chem. Int. Ed., vol. 51: pp. 11832-11835.
Schwartz, 2002, A Two-Dimensional Quadrupole lon Trap Mass Spectrometer, J. Am. Soc. Mass Spectrom, 13:659-669.
Takats, 2004, Electronsonic Spray Ionization. A Gentle Technique for Generating Folded Proteins and Protein Complexes in the Gas Phase and for Studying lon-Molecule Reactions at Atmospheric Pressure, Anal. Chem., 76(14):4050-4058.
Unterwurzacher, 2008, Rapid sample preparation and simultaneous quantitation of prostaglandins and lipoxygenase derived fatty acid metabolites by liquid chromatography-mass spectrometry from small sample volumes, Clinical Chemistry and Laboratory Medicine, De Gruyter, DE, 46(11):1589-1597.
Waters, 2015, DESI System Operator's Guide 715004701/Revision A. Waters Corporation p. 17, 42, 47, 48.
Wells, 1998, A Quadrupole Ion Trap with Cylindrical Geometry Operated in the Mass-Selective Instability Mode, Anal. Chem., 70:438-444.
Wu, 2009, Rapid, Direct Analysis of Cholesterol by Charge Labeling in Reactive Desorption Electropray Ionization, ANalytical Chemistry, American Chemical Society, 81(18):7618-7624.
Yan, 2016, Organic Reactions in Microdroplets: Reaction Acceleration Revealed by Mass Spectrometry, Angew. Chem. Int. Ed. 55:12960-12972.

* cited by examiner

Aim: Screen reaction mixtures rapidly and automatically for product(s) of interest

Concept: Screen from microtiter plate using desorption electrospray ionization (DESI)

- Accelerated reactions in droplets: accel. $10^{18}$ - $10^{5}$
- Imaging mode speed: up to $10^{4}$ rxns/hour
- Product ID by On-line MS and MS/MS: m/z 50 - 500

SYSTEMS AND METHODS FOR CONDUCTING REACTIONS AND SCREENING FOR REACTION PRODUCTS

RELATED APPLICATION

The present application is a continuation of U.S. nonprovisional application Ser. No. 18/101,265, filed Jan. 25, 2023, which is a continuation of U.S. nonprovisional application Ser. No. 17/745,209, filed May 16, 2022, which is a continuation of U.S. nonprovisional application Ser. No. 16/494,973, filed May 13, 2022, which is a 35 U.S.C. § 371 national phase application of PCT/US18/23747, filed Mar. 22, 2018, which claims the benefit of and priority to U.S. provisional patent application Ser. No. 62/474,902, filed Mar. 22, 2017, the content of each of which is incorporated by reference herein in its entirety.

GOVERNMENT INTEREST

This invention was made with government support under W911NF-16-2-0020 awarded by the Defense Advanced Research Projects Agency (DARPA). The government has certain rights in the invention.

FIELD OF THE INVENTION

The invention generally relates to systems and methods for conducting reactions and screening for reaction products.

BACKGROUND

Combinatorial chemistry involves chemical synthetic methods that make it possible to prepare a large number (tens to thousands or even millions) of compounds in a single process.

These compound libraries can be made as mixtures, sets of individual compounds or chemical structures generated by computer software. Combinatorial chemistry can be used for the synthesis of small molecules and for peptides. Advances in robotics have led to an industrial approach to combinatorial synthesis, enabling companies to routinely produce over 100,000 new and unique compounds per year.

However, there are many limitations in the present combinatorial chemistry process. For example, current approaches use separate systems for reaction synthesis and reaction screening. In a typical set-up, compound libraries are made manually or using a robotic instrument. That instrument is used to combine reagents and conduct reactions, which reaction times can vary from minutes to hours, to even days. Once completed, the compound library is then transferred to a screening instrument, such a mass spectrometer. The transfer process is manual, in which a person manually samples each reaction product and creates an array of reaction products on a substrate for screening. The screening instrument will be set-up to screen each of the reaction products in the combinatorial library, which can be time-consuming. The transfer process can lead to numerous errors, where samples become contaminated or mixed-up leading to improper data. Ultimately, the entire process needs to be repeated if the error cannot be resolved.

SUMMARY

The invention provides systems and methods that combine the reaction and screening process into a single workflow using a single instrument that performs both the reaction product synthesis and the reaction screening. The invention takes advantage of the fact that chemical reactions can be accelerated in a liquid droplet spray discharge. In that manner, the liquid droplet spray discharge can be used to rapidly conduct reactions from reagents at different locations on a substrate. The reaction occurs in the liquid droplet spray discharge as the spray discharge leaves the substrate surface toward an analysis device, such as a mass spectrometer. The formed reaction product is instantly analyzed in an automated manner without requiring any manual transfer of a reaction product from a synthesis instrument to a screening instrument. The substrate is under automated control, so that a standard combinatorial library can be generated and instantly screened without operator intervention.

In certain aspects, the invention provides, systems for conducting reactions and screening for reaction products that include a sampling probe configured to produce a liquid droplet spray discharge, a substrate configured to hold reagents for a reaction, and a mass spectrometer (e.g., bench-top mass spectrometer or a miniature mass spectrometer). The system is configured such that the sampling probe produces the liquid droplet spray discharge toward the substrate at an angle that the liquid droplet spray discharge impacts the substrate in order to desorb the reagents from the substrate and reflects from the substrate to an inlet of the mass spectrometer. As discussed herein, a rate of the reaction among the reagents in the liquid droplet spray discharge is accelerated as compared to a rate of the reaction among the reagents in a bulk liquid.

In certain embodiments, the sampling probe includes a gas source and a voltage source. An exemplary sampling probe is a desorption electrospray ionization probe and in such embodiments, the liquid droplet spray discharge is a desorption electrospray ionization active discharge. The substrate includes a plurality of discrete locations, one or more of which discrete locations include reagents for a reaction. In certain embodiments, the substrate is a movable substrate. In such embodiments, the movable substrate may be operably coupled to a motor that moves the substrate in an automated manner. In other embodiments, the sampling probe is operably coupled to an movable arm. In such embodiments, the movable arm is operably coupled to a motor that moves the sampling probe in an automated manner.

Other aspects of the invention provide methods for conducting reactions and screening for reaction products that involve directing a liquid droplet spray discharge from a sampling probe onto a substrate that includes reagents for a reaction such that the liquid droplet spray discharge desorbs the reagents from the substrate, conducting a reaction among the reagents in the liquid droplet spray discharge as the liquid droplets evaporate, thereby generating at least one ionized reaction product, and analyzing the ionized reaction product. In certain embodiments, a rate of the reaction among the reagents in the liquid droplet spray discharge is accelerated as compared to a rate of the reaction among the reagents in a bulk liquid.

In certain embodiments, the sampling probe includes a gas source and a voltage source. An exemplary sampling probe is a desorption electrospray ionization probe and in such embodiments, the liquid droplet spray discharge is a desorption electrospray ionization active discharge.

Numerous analysis techniques may be used with the methods of the invention. In an exemplary embodiment, analyzing involves receiving the ionized reaction product to a mass spectrometer (e.g., bench-top mass spectrometer or a miniature mass spectrometer), and conducting a mass spectral analysis of the ionized reaction product in the mass spectrometer.

In certain embodiments, the substrate comprises a plurality of discrete locations, one or more of which discrete locations include reagents for a reaction. The substrate may be a movable substrate. In such embodiments, the method further involves moving the substrate (e.g., manually or in an automated manner via a motor coupled to the substrate) from a first discrete location to a second discrete location, and repeating the method steps. In other embodiments, the sampling probe is operably coupled to an movable arm. In such embodiments, the method further involves moving the sampling probe (e.g., manually or in an automated manner via a motor coupled to the movable arm) from a first discrete location to a second discrete location; and repeating the method steps.

DETAILED DESCRIPTION

The invention recognizes that acceleration of the rates of ordinary organic reactions occurs in droplets, and in some instances by large factors. Without being limited by any particular theory or mechanism of action, it is believed that the acceleration is partly the result of solvent evaporation and the resulting increase in reagent concentrations. There is also evidence of intrinsic reaction acceleration at the surfaces of droplets, so that the increased surface to volume ratio of microdroplets plays a significant role in reaction acceleration. Without being limited by any particular theory or mechanism of action, it is believed that the distance of travel of droplets in a spray correlates roughly with the extent of reaction, suggesting that evaporation which creates smaller droplets also increases reaction rates.

Figure 1:
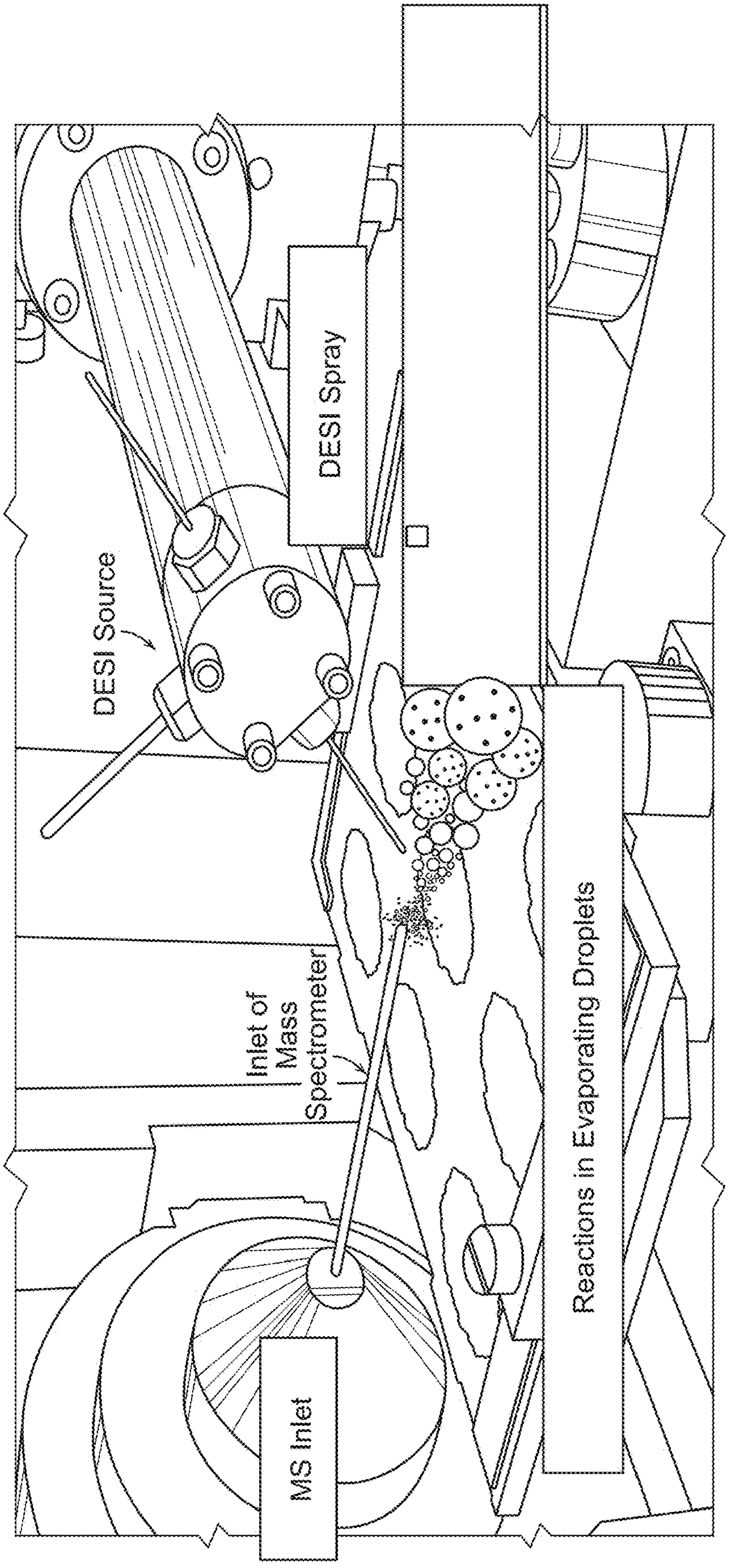
FIG. 1 is a schematic of an automated rapid reaction screening by DESI-MS.

To that end, the invention provides systems and methods for conducting reactions and screening for reaction products using a single system. FIG. 1 shows an exemplary system of the invention. The system includes a sampling probe, a substrate, and a mass spectrometer. The sampling probe produces a liquid droplet spray discharge. The probe is oriented with respect to the substrate such that the liquid droplet spray discharge impacts the substrate surface and then reflects from the substrate surface to an inlet of the mass spectrometer. As shown in FIG. 1, there are a plurality of discrete spots on the substrate. Each spot includes reagents for a reaction. Any number of spots can be placed on the substrate, such as 1, 2, 3, 4, 5, 10, 20, 50, 100, 1,000, 10,000, 100,000, 1,000,000, or even more. The liquid droplet spray discharge is directed to a single spot on the substrate, without impacting any other spots on the substrate. The liquid droplet spray discharge desorbs the reagents from a single spot. The reflected liquid droplet spray discharge now includes the reagents for the reaction. The environment in the liquid droplet spray discharge and the evaporation of the liquid causes an accelerated reaction among the reagents to produce an ionized reaction product. That ionized reaction product then enters the inlet of the mass spectrometer, as shown in FIG. 1, where the reaction product is analyzed. In certain embodiments, the solvent introduced to the system may include additional reagents that interact with the one or more reagents on the substrate for the reaction. Any reactants can be used with systems and methods of the invention, e.g., organic or inorganic reactants. The solvent merely needs to be compatible with the reactants and the system.

In certain embodiments, the substrate moves while the sampling probe remains stationary. In other embodiments, the sampling probe moves (via a movable arm coupled to the sampling probe) while the substrate remains stationary. In other embodiments, both move. Either or both of the substrate or moving arm can be mechanized and configured for automated control.

Figure 2:
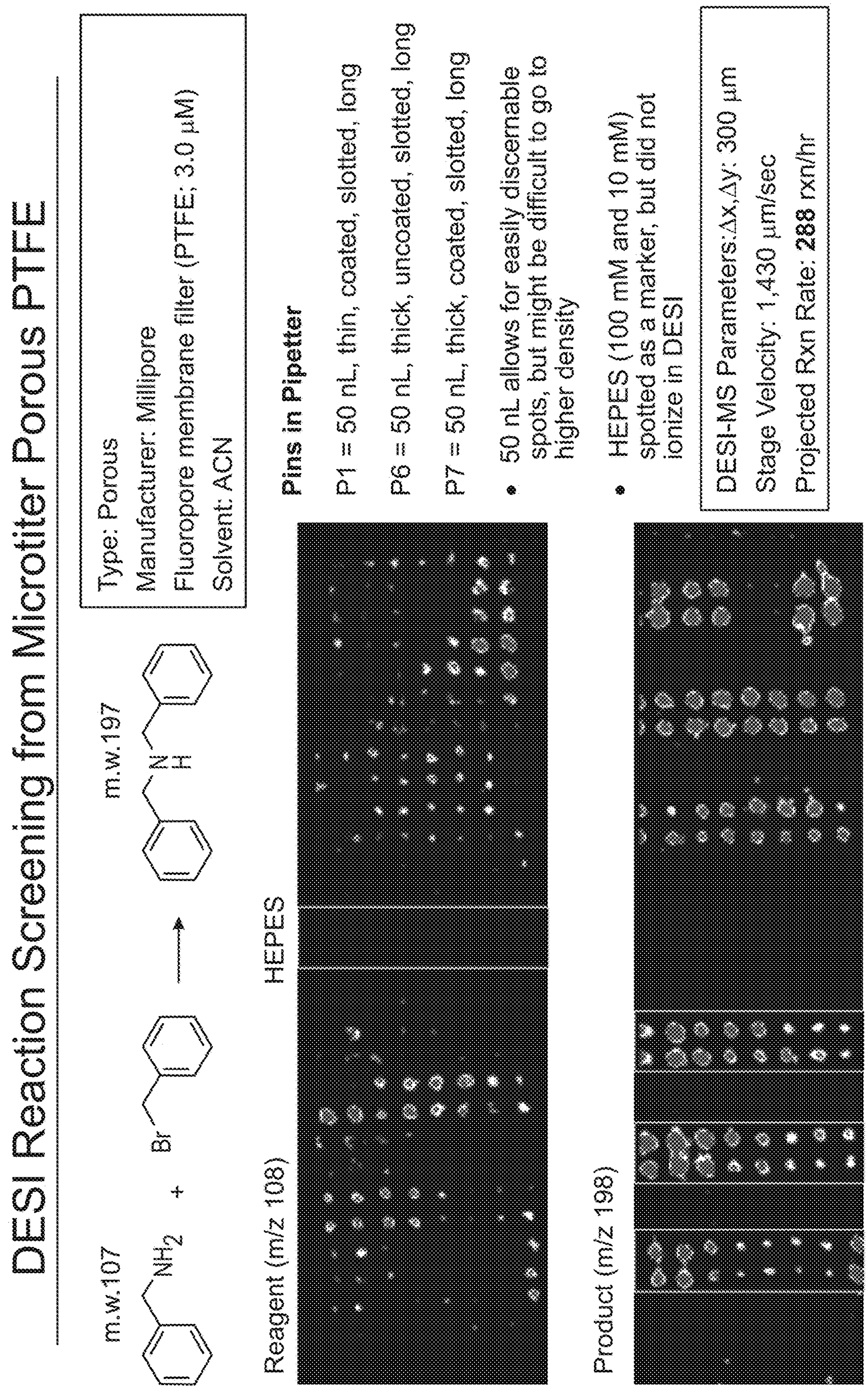
FIG. 2 shows DESI reaction screening from microtiter porous PTFE.
Figure 3:
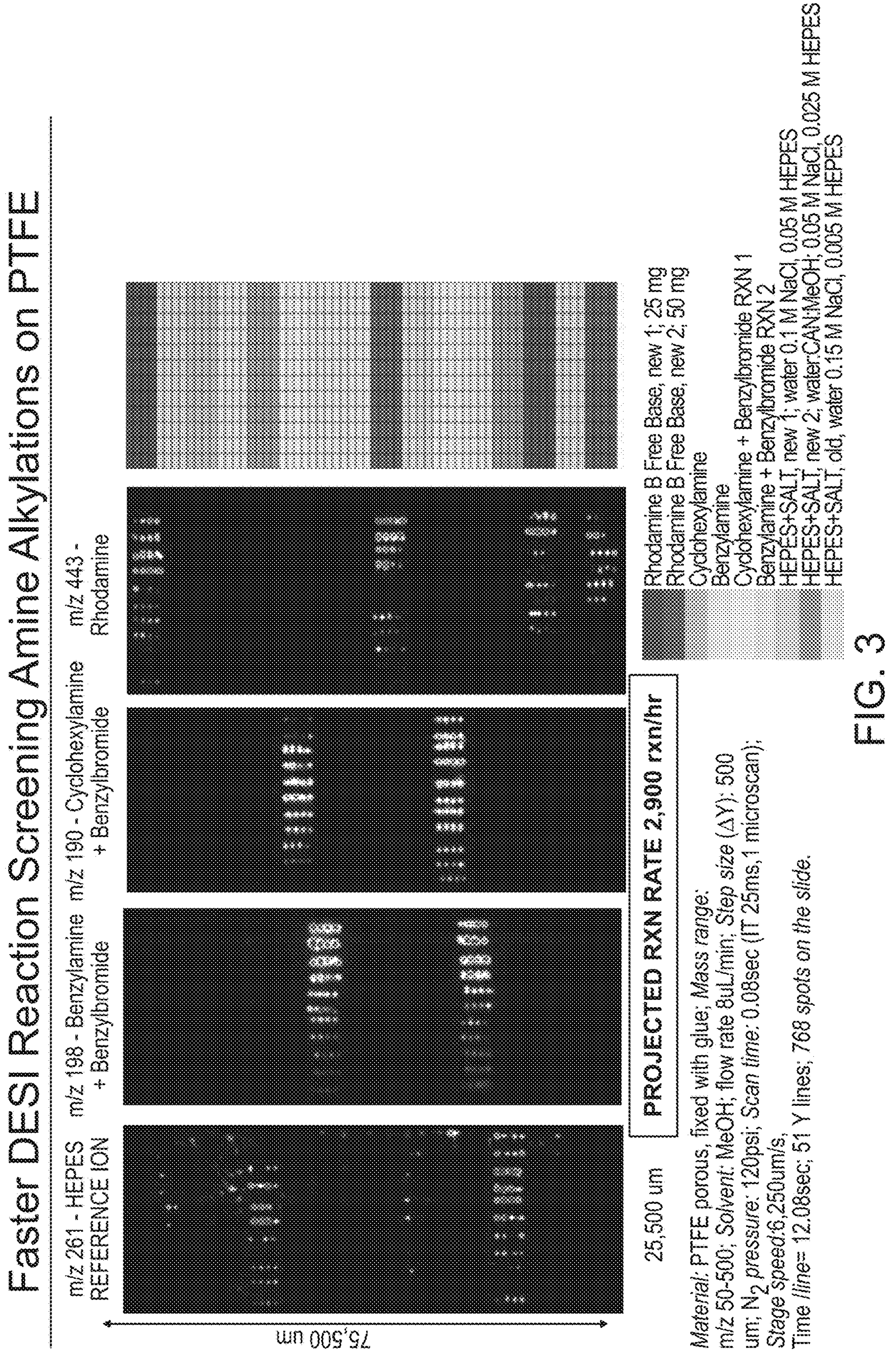
FIG. 3 shows faster DESI reaction screening amine alkylations on PTFE.
Figure 4:
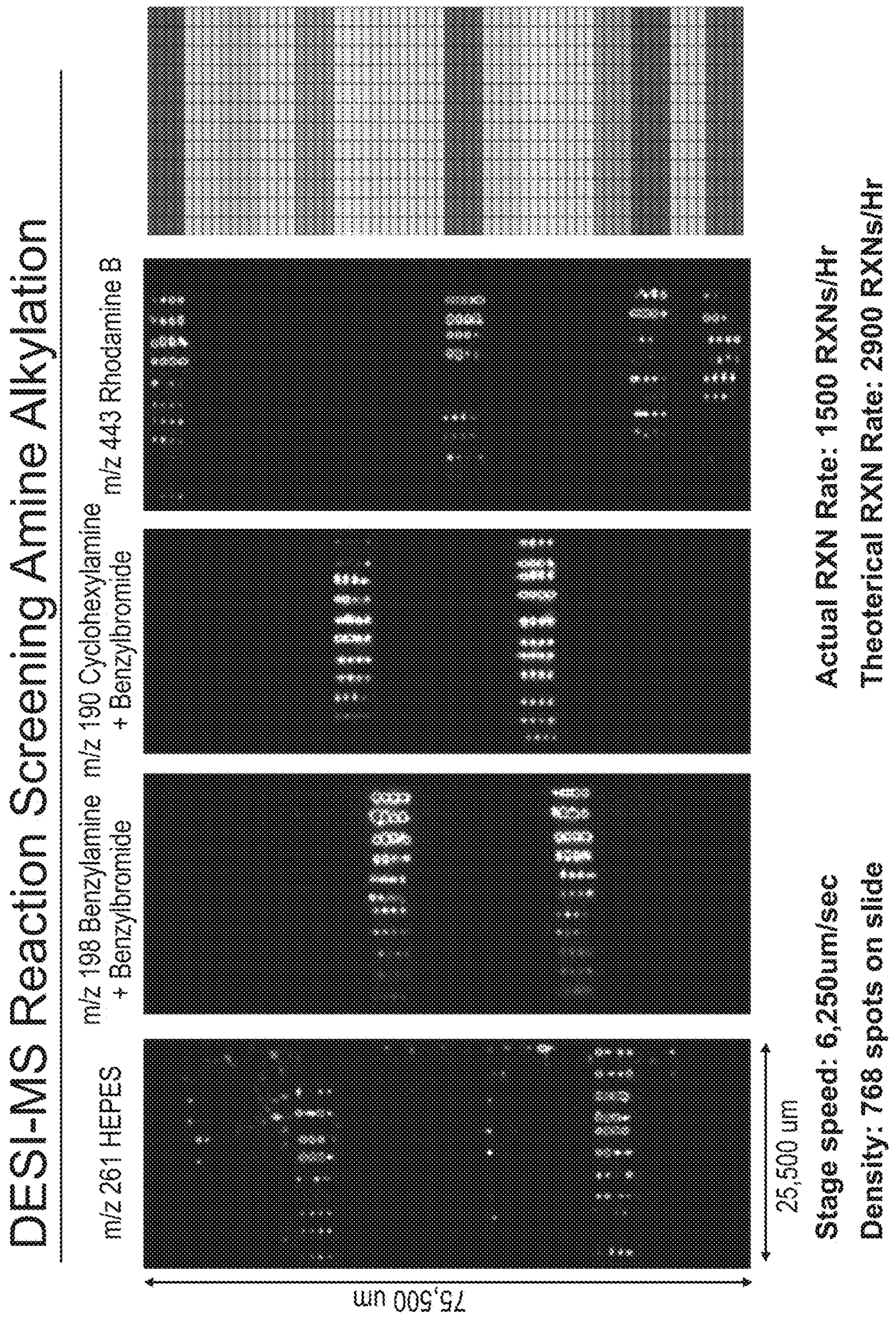
FIG. 4 shows DESI-MS reaction screening amine alkylation.

The system of FIG. 1 was used to produce the data shown in FIGS. 2-4.

Sampling Probe

In general, the systems of the invention can include a spray system in which pneumatics and optionally electrical potential are used to create a fine spray, for example an electrosonic spray ionization source, such as described for example in Takats et al. (*Anal. Chem.,* 2004, 76 (14), pp 4050-4058), the content of which is incorporated by reference herein in its entirety.

Alternative spray sources include electrospray sources and nanospray sources. The skilled artisan will recognize that any source that generates a liquid spray discharge including small droplets (e.g., microdroplets), charged or uncharged, can be used with systems and methods of the invention.

In certain embodiments, sampling probe is a desorption electrospray ionization probe and in such embodiments, the liquid droplet spray discharge is a desorption electrospray ionization active discharge. Desorption electrospray ionization (DESI) is described for example in Takats et al. (U.S. Pat. No. 7,335,897), the content of which is incorporated by reference herein in its entirety. DESI allows ionizing and desorbing a material (analyte) at atmospheric or reduced pressure under ambient conditions. A DESI system generally includes a device for generating a DESI-active spray by delivering droplets of a liquid into a nebulizing gas. The system also includes a means for directing the DESI-active spray onto a surface. It is understood that the DESI-active spray may, at the point of contact with the surface, include both or either charged and uncharged liquid droplets, gaseous ions, molecules of the nebulizing gas and of the atmosphere in the vicinity. The pneumatically assisted spray is directed onto the surface of a sample material where it interacts with one or more analytes, if present in the sample, and generates desorbed ions of the analyte or analytes. The desorbed ions can be directed to a mass analyzer for mass analysis, to an IMS device for separation by size and measurement of resulting voltage variations, to a flame spectrometer for spectral analysis, or the like.

Figure 5:
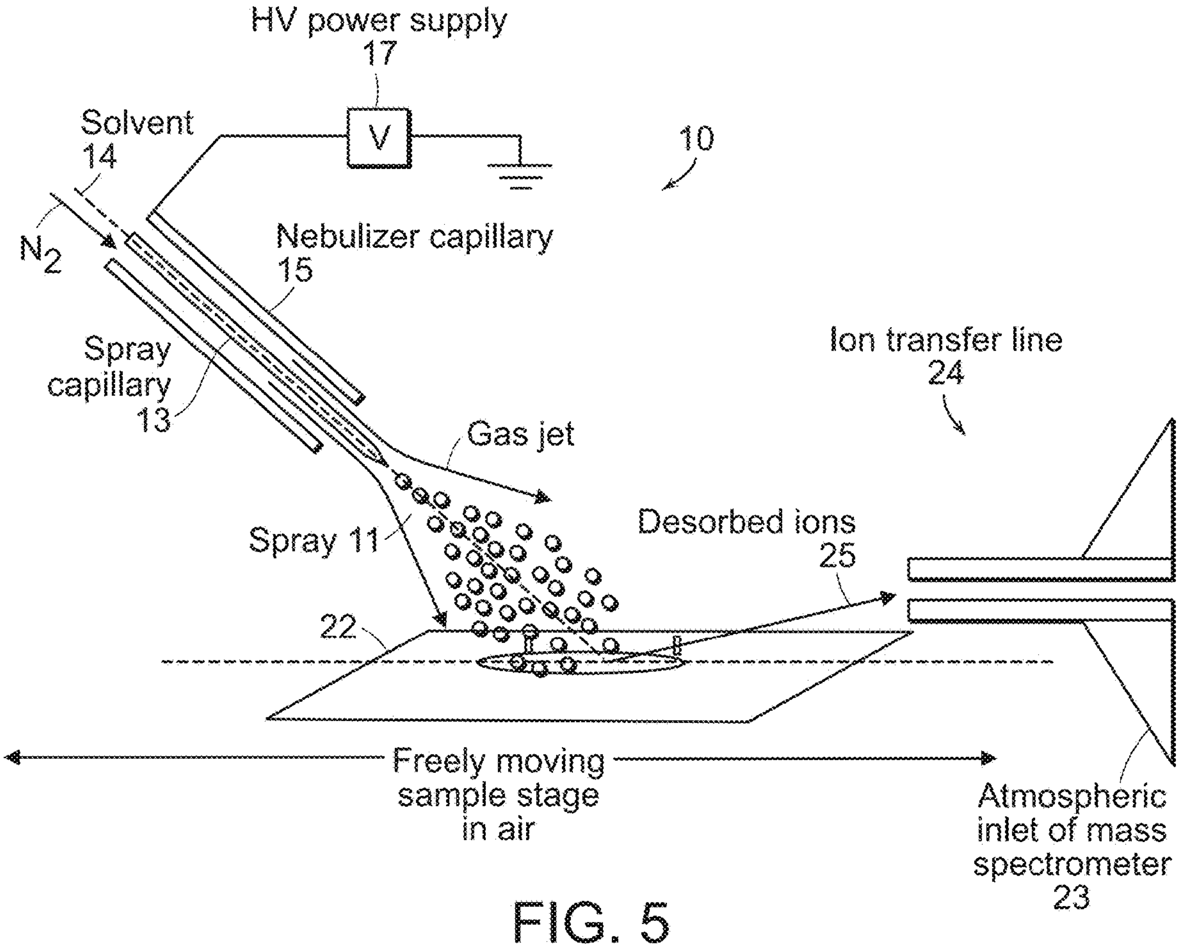
FIG. 5 is a schematic of a desorption electrospray ionization probe.

FIG. 5 illustrates schematically one embodiment of a DESI system 10. In this system, a spray 11 is generated by a conventional electrospray device 12. The device 12 includes a spray capillary 13 through which the liquid solvent 14 is fed. A surrounding nebulizer capillary 15 forms an annular space through which a nebulizing gas such as nitrogen (N 2) is fed at high velocity. In one example, the liquid was a water/methanol mixture and the gas was nitrogen. A high voltage is applied to the liquid solvent by a power supply 17 via a metal connecting element. The result of the fast flowing nebulizing gas interacting with the liquid leaving the capillary 13 is to form the DESI-active spray 11 comprising liquid droplets. DESI-active spray 11 also may include neutral atmospheric molecules, nebulizing gas, and gaseous ions. Although an electrospray device 12 has been described, any device capable of generating a stream of liquid droplets carried by a nebulizing gas jet may be used to form the DESI-active spray 11.

The spray 11 is directed onto the sample material 21 which in this example is supported on a surface 22. The desorbed ions 25 leaving the sample are collected and introduced into the atmospheric inlet or interface 23 of a mass spectrometer for analysis by an ion transfer line 24 which is positioned in sufficiently close proximity to the sample to collect the desorbed ions. Surface 22 may be a moveable platform or may be mounted on a moveable platform that can be moved in the x, y or z directions by well-known drive means to desorb and ionize sample 21 at different areas, sometimes to create a map or image of the distribution of constituents of a sample. Electric potential and temperature of the platform may also be controlled by known means. Any atmospheric interface that is normally found in mass spectrometers will be suitable for use in the invention. Good results have been obtained using a typical heated capillary atmospheric interface. Good results also have been obtained using an atmospheric interface that samples via an extended flexible ion transfer line made either of metal or an insulator.

Ion Transfer

In certain embodiments, the mass spectrometer inlet is located remote from the ionization probe and an ion transfer member is used to transfer over longer distances. Exemplary ion transfer members are described for example in Ouyang et al. (U.S. Pat. No. 8,410,431), the content of which is incorporated by reference herein in its entirety. In certain embodiments, the transfer of the ion into the inlet of a mass spectrometer relies on the gas flow into the inlet under the influence of the vacuum of the spectrometer and the electric field in the surrounding area. The gas flow is typically low due to the low conductance of the inlet, which serve as the conductance barrier between atmosphere and vacuum manifold.

In certain embodiments, systems and methods of the invention generate a laminar gas flow that allows for efficient transfer of ions without significant loss of signal intensity over longer distances, such as distances of at least about 5 cm, at least about 10 cm, at least about 20 cm, at least about 50 cm, at least about 100 cm, at least about 500 cm, at least about 1 m, at least about 3 m, at least about 5 m, at least about 10 m, and other distances.

Figure 7:
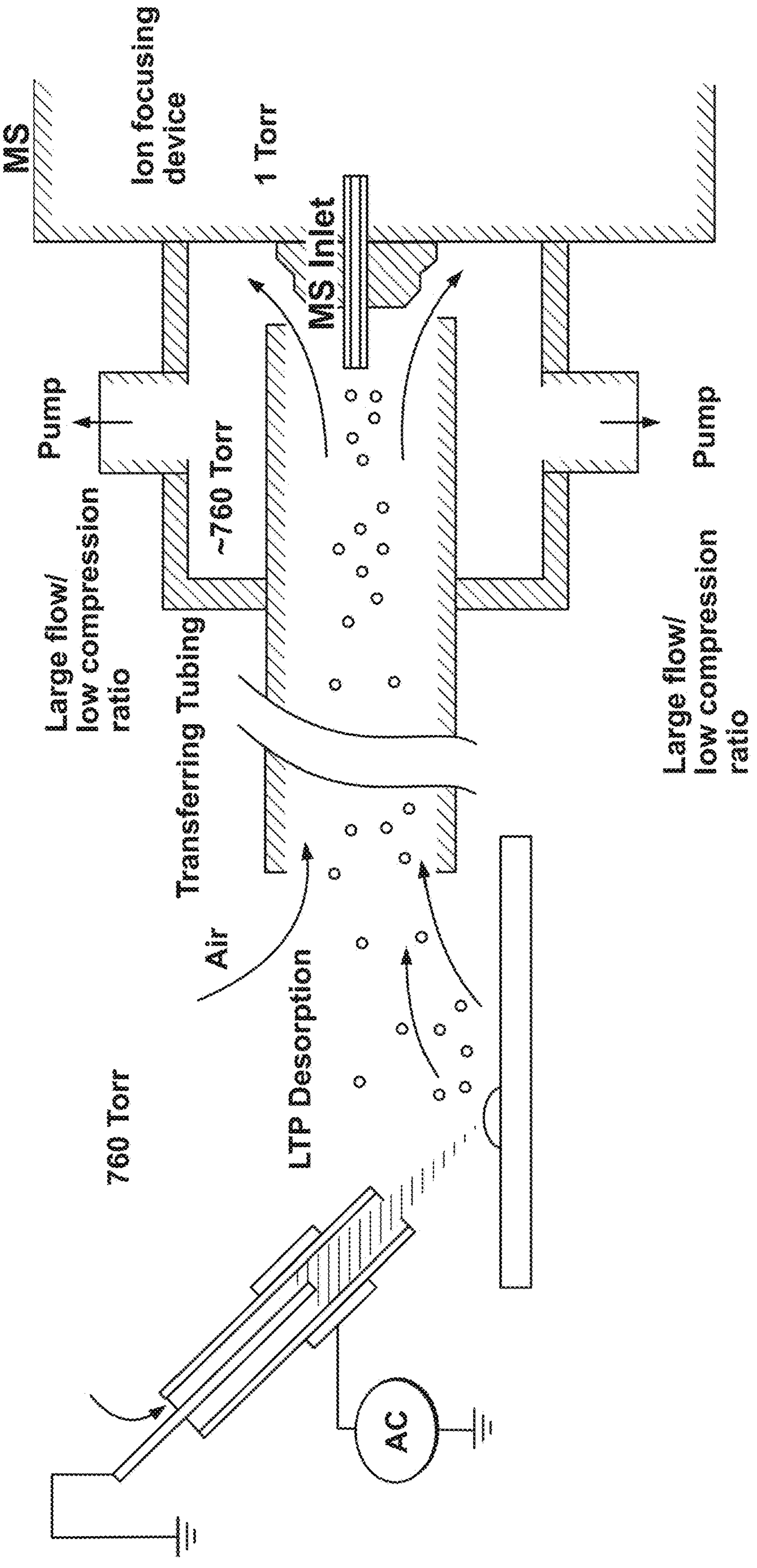
FIG. 7 is a schematic of an embodiment with an in transfer member between a mass spectrometer and a DESI source.

In aspects of the invention and as shown in FIG. 7, an ion transfer member is operably coupled to the source of DESI-active spray and produces a laminar gas flow that transfers the gas phase ions to an inlet of the ion analysis device, such as a mass spectrometer having a mass analyzer.

Systems of the invention provide enlarged flow to carry ions from a distant sample to an inlet of an ion analysis device, such as an inlet of a mass spectrometer. The basic principle used in the transport device is the use of the gas flow to direct gas and ions into the ion transfer member and to form a laminar flow inside the ion transfer member to keep the ions away from the walls while transferring the gas and ions through the ion transfer member. The analyte ions of interest are sampled at some point downstream along the ion transfer member. The laminar flow is achieved by balancing the incoming and outgoing gas flow. Thus recirculation regions and/or turbulence are avoided. Thus, the generated laminar flow allows for high efficient ion transport over long distance or for sampling of ions over large areas.

Systems of the invention also provide enlarged flow to carry ions from the ion source to an inlet of a miniature mass spectrometer, which has small pumping systems and compromised gas intake capability at the inlet. Additional gas flow provided by a miniature sample pump connected with the ion transfer member facilitates ion transfer from an ambient ionization source to the vicinity of the inlet of the miniature mass spectrometer. Thus the intensity of the ions for the analytes of interest is increased for mass analysis.

The ion transfer member, e.g., a tube with an inner diameter of about 10 mm or greater, is used to transfer ions from the ionization source to the inlet of an ion analysis device, e.g., a mass spectrometer. The larger opening of the ion transfer member, as compared to the opening of the inlet of the ion analysis device, is helpful for collection of sample ions generated in a large space, e.g. on a surface of large area. The large flow conductance of the ion transfer member allows the gas carrying ions to move toward the inlet of the ion analysis device at a fast flow rate. The ion transfer member is coupled to the DESI-active spray source such that a distal portion of the source is inserted within the transfer member so that the DESI-active spray is produced within the transfer member. The DESI-active spray source produces a gas flow inside the ion transfer member. The inlet of the ion analysis device receives the ions transferred from the ambient ionization source.

The ion transfer member may be any connector that allows for production of a laminar flow within it and facilitates transfer of ions without significant loss of ion current. Exemplary ion transfer members include tubes, capillaries, covered channels, open channels, and others. In a particular embodiment, the ion transfer member is a tube. The ion transfer member may be composed of rigid material, such as metal or glass, or may be composed of flexible material such as plastics, rubbers, or polymers. An exemplary flexible material is TYGON tubing.

The ion transfer member may be any shape as long the shape allows for the production of a flow to prevent the ions from reaching the internal surfaces of the ion transfer member where they might become neutral. For example, the ion transfer member may have the shape of a straight line. Alternatively, the ion transfer member may be curved or have multiple curves.

In still other embodiments, the ion transfer member includes additional features to prevent ions from being adsorbed onto the inside wall. For example, a dielectric barrier discharge (DBD) tubing is made from a double stranded speaker wire. The insulator of the wire serves as the dielectric barrier and the DBD occurs when high voltage AC is applied between the two strands of the wire. The DBD inside the tube prevents the ions from adsorbing onto the wall and provide a charge-enriched environment to keep the ions in the gas phase. This DBD tube can also be used for ionizing the gas samples while transferring the ions generated to the inlet of the ion analysis device. The DBD tube can also be used for ion reactions while transferring the ions generated to the inlet of the ion analysis device.

After moving through the ion transfer member, the ions are then separated based on their mass/charge ratio or their mobility or both their mass/charge ratio and mobility. For example, the ions can be accumulated in an ion analysis device such as a quadrupole ion trap (Paul trap), a cylindrical ion trap (Wells, J. M.; Badman, E. R.; Cooks, R. G., *Anal. Chem.,* 1998, 70, 438-444), a linear ion trap (Schwartz, J. C.; Senko, M. W.; Syka, J. E. P., *J. Am. Soc. Mass Spectrom,* 2002, 13, 659-669), an ion cyclotron resonance (ICR) trap, an orbitrap (Hu et al., *J. Mass. Spectrom.,* 40:430-433, 2005), a sector, or a time of flight mass spectrometer. Additional separation might be based on mobility using ion drift devices or the two processes can be integrated.

Ion Analysis

Figure 6:
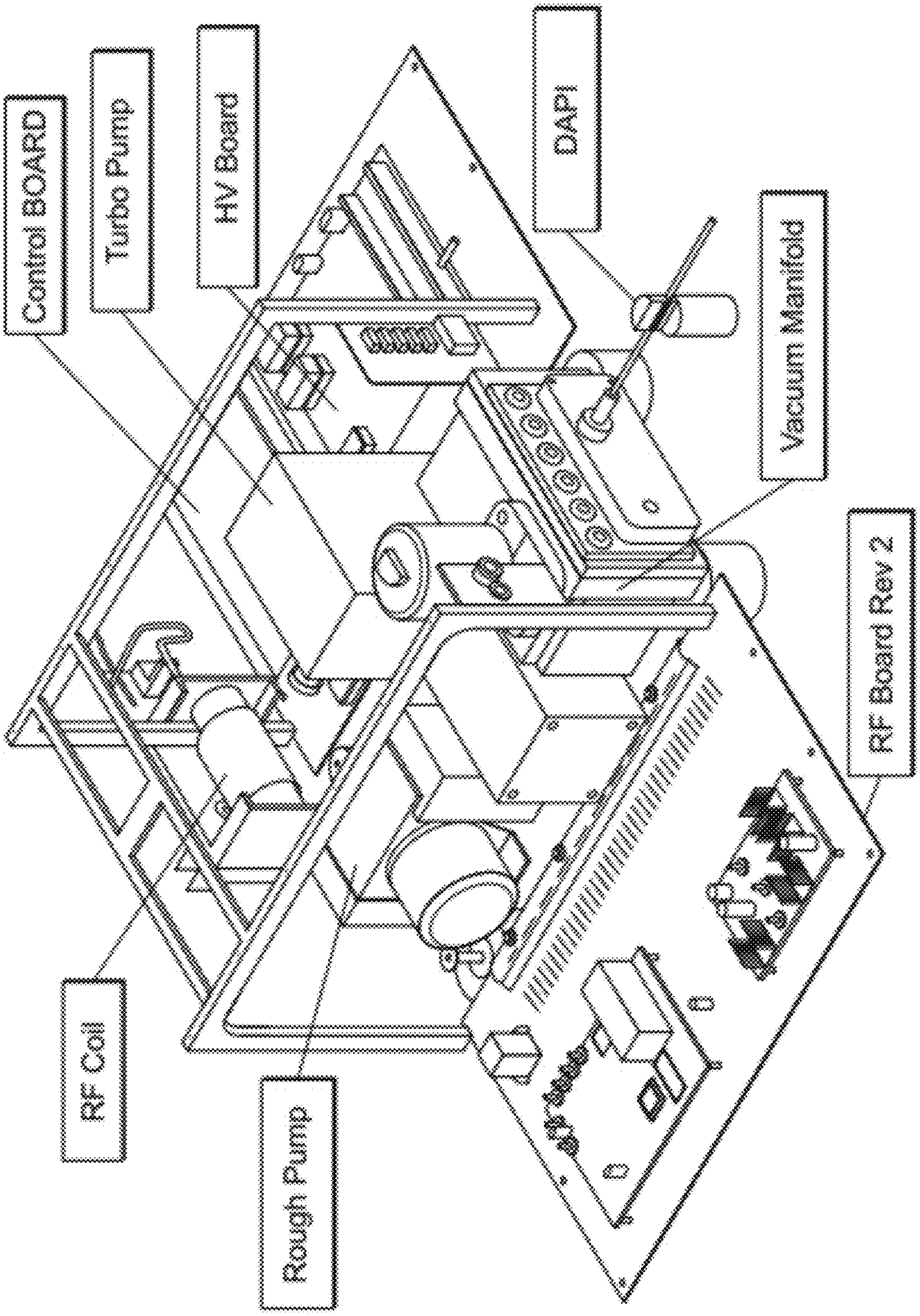
FIG. 6 is a schematic of a miniature mass spectrometer.

In certain embodiments, the ions are analyzed by directing them into a mass spectrometer (bench-top or miniature mass spectrometer). FIG. 6 is a picture illustrating various components and their arrangement in a miniature mass spectrometer. The control system of the Mini 12 (Linfan Li, Tsung-Chi Chen, Yue Ren, Paul I. Hendricks, R. Graham Cooks and Zheng Ouyang "Miniature Ambient Mass Analysis System" *Anal. Chem.* 2014, 86 2909-2916, DOI: 10.1021/ac403766c; and 860. Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" *Anal. Chem.,* 2014, 86 2900-2908 DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", *Anal. Chem.,* 78 (2006) 5994-6002 DOI: the content of which is incorporated by reference herein in its entirety) may be combined to produce the miniature mass spectrometer shown in FIG. 10. It may have a size similar to that of a shoebox (H20×W25 cm×D35 cm). In certain embodiments, the miniature mass spectrometer uses a dual LIT configuration, which is described for example in Owen et al. (U.S. patent application Ser. No. 14/345,672), and Ouyang et al. (U.S. patent application Ser. No. 61/865,377), the content of each of which is incorporated by reference herein in its entirety.

The mass spectrometer (miniature or benchtop), may be equipped with a discontinuous interface. A discontinuous interface is described for example in Ouyang et al. (U.S. Pat. No. 8,304,718) and Cooks et al. (U.S. patent application publication number 2013/0280819), the content of each of which is incorporated by reference herein in its entirety.

Collection of Ions and/or Reaction Products without or after Mass-Selective Analysis Systems and methods for collecting ions or reaction products that have been analyzed by a mass spectrometer are shown in Cooks (U.S. Pat. No. 7,361,311), the content of which is incorporated by reference herein in its entirety. In certain embodiments, ions and/or reaction products may be collected after mass analysis as described in Cooks (U.S. Pat. No. 7,361,311). In other embodiments, ions and/or reaction products may be collected in the ambient environment, at atmospheric pressure or under vacuum, without mass analysis. The collected ions and/or reaction products may then be subsequently analyzed by any suitable technique, such as infrared spectrometry or mass spectrometry.

Generally, the preparation of a microchip or substrate with an array of molecules, e.g., reaction products, first involves the production of a reaction product in the liquid droplet spray discharge, as described above. The ions and/or reaction products can then be focused and collected using methods described below or can first be separated based on their mass/charge ratio or their mobility or both their mass/charge ratio and mobility. For example, the ions and/or reaction products can be accumulated in an ion storage device such as a quadrupole ion trap (Paul trap, including the variants known as the cylindrical ion trap and the linear ion trap) or an ion cyclotron resonance (ICR) trap. Either within this device or using a separate mass analyzer (such as a quadrupole mass filter or magnetic sector or time of flight), the stored ions are separated based on mass/charge ratios. Additional separation might be based on mobility using ion drift devices or the two processes can be integrated. The separated ions and/or reaction products are then deposited on a microchip or substrate at individual spots or locations in accordance with their mass/charge ratio or their mobility to form a microarray.

To achieve this, the microchip or substrate is moved or scanned in the x-y directions and stopped at each spot location for a predetermined time to permit the deposit of a sufficient number of molecules of the and/or reaction product to form a spot having a predetermined density. Alternatively, the gas phase ions and/or reaction products can be directed electronically or magnetically to different spots on the surface of a stationary chip or substrate. The reaction products are preferably deposited on the surface with preservation of their structure, that is, they are soft-landed. Two facts make it likely that dissociation or denaturation on landing can be avoided. Suitable surfaces for soft-landing are chemically inert surfaces that can efficiently remove vibrational energy during landing, but which will allow spectroscopic identification. Surfaces which promote neutralization, rehydration or having other special characteristics might also be used for protein soft-landing.

Generally, the surface for ion and/or reaction product landing is located after the ion focusing device, and in embodiments where ions are first separated, the surface is located behind the detector assembly of the mass spectrometer. In the ion detection mode, the high voltages on the conversion dynode and the multiplier are turned on and the ions are detected to allow the overall spectral qualities, signal-to-noise ratio and mass resolution over the full mass range to be examined. In the ion-landing and/or reaction product-landing mode, the voltages on the conversion dynode and the multiplier are turned off and the ions and/or reaction products are allowed to pass through the hole in the detection assembly to reach the landing surface of the plate (such as a gold plate). The surface is grounded and the potential difference between the source and the surface is 0 volts.

An exemplary substrate for soft landing is a gold substrate (20 mm×50 mm, International Wafer Service). This substrate may consist of a Si wafer with 5 nm chromium adhesion layer and 200 nm of polycrystalline vapor deposited gold. Before it is used for ion landing, the substrate is cleaned with a mixture of $H_2SO_4$ and $H_2O_2$ in a ratio of 2:1, washed thoroughly with deionized water and absolute ethanol, and then dried at 150° C. A Teflon mask, 24 mmx 71 mm with a hole of 8 mm diameter in the center, is used to cover the gold surface so that only a circular area with a diameter of 8 mm on the gold surface is exposed to the ion beam for ion soft-landing of each mass-selected ion beam. The Teflon mask is also cleaned with 1:1 MeOH:$H_2O$ (v/v) and dried at elevated temperature before use. The surface and the mask are fixed on a holder and the exposed surface area is aligned with the center of the ion optical axis.

Any period of time may be used for landing of the ions and/or reaction products. In certain embodiments, between each ion-landing and/or reaction product-landing, the instrument is vented, the Teflon mask is moved to expose a fresh surface area, and the surface holder is relocated to align the target area with the ion optical axis. After soft-landing, the Teflon mask is removed from the surface.

In another embodiment a linear ion trap can be used as a component of a soft-landing instrument. Ions travel through a heated capillary into a second chamber via ion guides in chambers of increasing vacuum. The ions and/or reaction products are captured in the linear ion trap by applying suitable voltages to the electrodes and RF and DC voltages to the segments of the ion trap rods. The stored ions can be radially ejected for detection. Alternatively, the ion trap can be operated to eject the ions and/or reaction products of selected mass through the ion guide, through a plate onto the microarray plate. The plate can be inserted through a mechanical gate valve system without venting the entire instrument.

The advantages of the linear quadrupole ion trap over a standard Paul ion trap include increased ion storage capacity and the ability to eject ions both axially and radially. Linear ion traps give unit resolution to at least 2000 Thomspon (Th) and have capabilities to isolate ions of a single mass/charge ratio and then perform subsequent excitation and dissociation in order to record a product ion MS/MS spectrum. Mass analysis will be performed using resonant waveform methods. The mass range of the linear trap (2000 Th or 4000 Th but adjustable to Th) will allow mass analysis and soft-landing of most molecules of interest. In the soft-landing instrument described above the ions are introduced axially into the mass filter rods or ion trap rods. The ions can also be radially introduced into the linear ion trap.

Methods of operating the above described soft-landing instruments and other types of mass analyzers to soft-land ions of different masses at different spots on a microarray are now described. The reaction products are introduced into the mass filter. Ions and/or reaction products of selected mass-to-charge ratio will be mass-filtered and soft-landed on the substrate for a period of time. The mass-filter settings then will be scanned or stepped and corresponding movements in the position of the substrate will allow deposition of the ions and/or reaction products at defined positions on the substrate.

The ions and/or reaction products can be separated in time so that the ions and/or reaction products arrive and land on the surface at different times. While this is being done the substrate is being moved to allow the separated ions and/or reaction products to be deposited at different positions. A spinning disk is applicable, especially when the spinning period matches the duty cycle of the device. The applicable devices include the time-of-flight and the linear ion mobility drift tube. The ions and/or reaction products can also be directed to different spots on a fixed surface by a scanning electric or magnetic fields.

In another embodiment, the ions and/or reaction products can be accumulated and separated using a single device that acts both as an ion storage device and mass analyzer. Applicable devices are ion traps (Paul, cylindrical ion trap, linear trap, or ICR). The ions and/or reaction products are accumulated followed by selective ejection of the ions for soft-landing. The ions and/or reaction products can be accumulated, isolated as ions of selected mass-to-charge ratio, and then soft-landed onto the substrate. Ions and/or reaction products can be accumulated and landed simultaneously. In another example, ions and/or reaction products of various mass-to-charge ratios are continuously accumulated in the ion trap while at the same time ions of a selected mass-to-charge ratio can be ejected using SWIFT and soft-landed on the substrate.

In a further embodiment of the soft-landing instrument, ion mobility is used as an additional (or alternative) separation parameter. As before, ions and/or reaction products are generated by a suitable ionization source, such as those described herein. The ions and/or reaction products are then subjected to pneumatic separation using a transverse air-flow and electric field. The ions and/or reaction products move through a gas in a direction established by the combined forces of the gas flow and the force applied by the electric field. Ions and/or reaction products are separated in time and space. The ions and/or reaction products with the higher mobility arrive at the surface earlier and those with the lower mobility arrive at the surface later at spaces or locations on the surface.

The instrument can include a combination of the described devices for the separation and soft-landing of ions and/or reaction products of different masses at different locations. Two such combinations include ion storage (ion traps) plus separation in time (TOF or ion mobility drift tube) and ion storage (ion traps) plus separation in space (sectors or ion mobility separator).

It is desirable that the structure of the reaction product be maintained during the soft-landing process. One such strategy for maintaining the structure of the reaction product upon deposition involves keeping the deposition energy low to avoid dissociation or transformation of the ions and/or reaction products when they land. This needs to be done while at the same time minimizing the spot size. Another strategy is to mass select and soft-land an incompletely desolvated form of the ionized molecules and/or reaction products. Extensive hydration is not necessary for molecules to keep their solution-phase properties in gas-phase. Hydrated molecular ions and/or reaction products can be formed by electrospray and separated while still "wet" for soft-landing. The substrate surface can be a "wet" surface for soft-landing, this would include a surface with as little as one monolayer of water. Another strategy is to hydrate the molecule and/or reaction product immediately after mass-separation and prior to soft-landing. Several types of mass spectrometers, including the linear ion trap, allow ion/molecule reactions including hydration reactions. It might be possible to control the number of water molecules of hydration. Still further strategies are to deprotonate the mass-selected ions using ion/molecule or ion/ion reactions after separation but before soft-landing, to avoid undesired ion/surface reactions or protonate at a sacrificial derivatizing group which is subsequently lost.

Different surfaces are likely to be more or less well suited to successful soft-landing. For example, chemically inert surfaces which can efficiently remove vibrational energy during landing may be suitable. The properties of the surfaces will also determine what types of in situ spectroscopic identification are possible. The ions can be soft-landed directly onto substrates suitable for MALDI. Similarly, soft-landing onto SERS-active surfaces should be possible. In situ MALDI and secondary ion mass spectrometry can be performed by using a bi-directional mass analyzer such as a linear trap as the mass analyzer in the ion deposition step and also in the deposited material analysis step.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A method for conducting reactions and screening for reaction products, the method comprising:

providing a substrate comprising a plurality of discrete spots;

directing a liquid droplet spray discharge from a sampling probe onto a first discrete spot of the plurality of discrete spots on the substrate, wherein the first discrete spot comprises reagents for a reaction, wherein the liquid droplet spray discharge also comprises one or more reagents for the reaction and the liquid droplet spray discharge desorbs the reagents from the first discrete spot of the plurality of discrete spots on the substrate;

conducting a reaction among the reagents on the substrate and the reagents from the liquid droplet spray discharge in the liquid droplet spray discharge as the liquid droplets evaporate, thereby generating at least one ionized reaction product;

analyzing the ionized reaction product; and repeating the method at least a second discrete spot of the plurality of discrete spots on the substrate.

2. The method according to claim 1, wherein the sampling probe is a desorption electrospray ionization probe and the liquid droplet spray discharge is a desorption electrospray ionization active discharge.

3. The method according to claim 1, wherein analyzing comprises:

receiving the ionized reaction product to a mass spectrometer; and conducting a mass spectral analysis of the ionized reaction product in the mass spectrometer.

4. The method according to claim 3, wherein the mass spectrometer is a bench-top mass spectrometer or a miniature mass spectrometer.

5. The method according to claim 1, wherein a rate of the reaction among the reagents in the liquid droplet spray discharge is accelerated as compared to a rate of the reaction among the reagents in a bulk liquid.

6. The method according to claim 1, wherein the substrate is a movable substrate.

7. The method according to claim 6, wherein the method further comprises:

moving the substrate from a first discrete spot to a second discrete spot; and repeating the method steps.

8. The method according to claim 1, wherein the sampling probe is operably coupled to an movable arm.

9. The method according to claim 8, wherein the method further comprises:

moving the sampling from a first discrete spot to a second discrete spot; and repeating the method steps.

10. The method of claim 1, wherein each of the plurality of discrete spots on the substrate comprise different reagents for a reaction.

* * * * *